US008453326B2

(12) United States Patent
Durocher et al.

(10) Patent No.: US 8,453,326 B2
(45) Date of Patent: Jun. 4, 2013

(54) METHOD FOR ASSEMBLING RADIALLY LOADED VANE ASSEMBLY OF GAS TURBINE ENGINE

(75) Inventors: Eric Durocher, Vercheres (CA); Anca Mateescu, Westmount (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 13/351,634

(22) Filed: Jan. 17, 2012

(65) Prior Publication Data

US 2012/0110849 A1 May 10, 2012

Related U.S. Application Data

(62) Division of application No. 12/236,128, filed on Sep. 23, 2008, now Pat. No. 8,151,422.

(51) Int. Cl.
*B21K 25/00* (2006.01)
*B23P 15/04* (2006.01)

(52) U.S. Cl.
USPC .......................................................... 29/889.21

(58) Field of Classification Search
USPC .......................................................... 29/889.21
See application file for complete search history.

(56) References Cited

U.S. PATENT DOCUMENTS

| | | | |
|---|---|---|---|
| 3,326,523 | A | 6/1967 | Bobo |
| 3,394,919 | A | 7/1968 | Catterfield |
| 3,857,649 | A | 12/1974 | Schaller et al. |
| 4,255,086 | A | 3/1981 | Roberts |
| 4,304,523 | A | 12/1981 | Corsmeier et al. |
| 4,363,600 | A | 12/1982 | Thebert |
| 4,516,910 | A | 5/1985 | Bouiller et al. |
| 4,632,634 | A | 12/1986 | Vinciguerra et al. |
| 4,721,434 | A | 1/1988 | Marshall et al. |
| 4,868,963 | A | 9/1989 | Corsmeier et al. |
| 4,897,021 | A | 1/1990 | Chaplin et al. |
| 4,953,282 | A | 9/1990 | Corsmeier et al. |
| 4,990,056 | A | 2/1991 | McClain et al. |
| 5,681,142 | A | 10/1997 | Lewis |
| 6,061,886 | A | 5/2000 | Nitta et al. |
| 6,409,472 | B1 | 6/2002 | McMahon et al. |
| 6,733,237 | B2 | 5/2004 | Ingistov |
| 6,761,538 | B2 | 7/2004 | Fitts et al. |
| 6,932,566 | B2 | 8/2005 | Suzumura et al. |
| 6,969,239 | B2 | 11/2005 | Grant et al. |
| 7,048,504 | B2 | 5/2006 | Bailleul et al. |
| 7,238,003 | B2 | 7/2007 | Synnott et al. |
| 7,762,768 | B2 | 7/2010 | Shi et al. |
| 2007/0052179 | A1 | 3/2007 | Snowsill |
| 2009/0155068 | A1 | 6/2009 | Durocher et al. |

*Primary Examiner* — David Bryant
*Assistant Examiner* — Moshe Wilensky
(74) *Attorney, Agent, or Firm* — Norton Rose Canada LLP

(57) ABSTRACT

A method for assembling a vane ring with a vane support of a vane assembly in a gas turbine engine is described, and includes flexing each of the radial loading elements into the resiliently flexed state simultaneously by sliding the radial loading elements against corresponding lead-in tapers. This can be achieved, for example, using a guide tool which includes a plurality of segments bearing the lead-in tapers and which is previously assembled to the vane support.

11 Claims, 8 Drawing Sheets

11
10
18
17
16
14
12

METHOD FOR ASSEMBLING RADIALLY LOADED VANE ASSEMBLY OF GAS TURBINE ENGINE

RELATED APPLICATIONS

The present application is a Divisional of U.S. patent application Ser. No. 12/236,128 filed Sep. 23, 2008, now U.S. Pat. No. 8,151,422 the entire content of which is incorporated by reference herein.

TECHNICAL FIELD

The present invention relates generally to gas turbine engines, and more particularly to the assembly of vanes thereof.

BACKGROUND

The turbine section of gas turbine engines typically includes a number of stages of turbine vanes, each composed of a plurality of radially extending vanes which are mounted within a support structure and often comprise vane ring assemblies. Each of the turbine vanes segments is mounted within a surrounding support of the vane ring assembly. While the turbine vanes must be maintained in place, sufficient allowance must be made for thermal growth differential between the vanes and their supporting structure, given the high temperatures to which the turbine vanes are exposed during operation of the gas turbine engine. As such, a given amount of axial and/or radial looseness is provided between the vane and its support, such as to permit thermal growth and thus to allow for axial and/or radial movement of the vane within the support while minimizing any potential friction therebetween. However, such tolerances which allow for thermal growth can sometimes cause undesirable movement of the vanes at certain temperatures, and can lead to engine vibration.

As improved vane assemblies and associated support structures are sought to address these issues, the need for efficient methods and tools used for mounting such vane assemblies also exist.

SUMMARY

There is provided a method for assembling a vane ring with a vane support of a vane assembly in a gas turbine engine, the vane ring having a plurality of annularly interspaced radial loading elements which, when the vane ring is assembled to the vane support, are in a resiliently flexed state and exert corresponding annularly interspaced and outward-oriented radial loads against the vane support, thereby restraining relative radial movement between the vane ring and the vane support during operation of the gas turbine engine, the method comprising simultaneously flexing each of the radial loading elements into the resiliently flexed state by sliding the radial loading elements against corresponding lead-in tapers and subsequently assembling the vane ring to the vane support.

There is also provided a guide tool for assembling a vane ring with a vane support of a vane assembly in a gas turbine engine, the vane support having radial-facing abutment surfaces, annularly disposed and circumferentially interspaced relative to the longitudinal axis, the vane ring having a plurality of resiliently flexible radial loading elements associated with corresponding ones of the abutment surfaces, the radial loading elements being at a first radial position when in an unflexed state, and being resiliently flexible to a second radial position defining a flexed state, said second radial position corresponding to a radial position of corresponding abutment surfaces of the vane support, the guide tool comprising: a plurality of segments each having a guiding surface extending between a first end and a second end thereof, the first end being attachable to the vane support into a guiding position wherein, in the guiding position, the second end extends away from the vane support and the guiding surface faces a radial direction and defines a lead-in taper between the second end and first end, the first end coinciding with a corresponding abutment surface of the vane support, the guide tool in the guiding position providing a plurality of lead-in tapers extending between the second radial position and the first radial position and associated with corresponding abutment surfaces.

There is further provided a method of assembling a vane ring and a vane support of a vane assembly for a gas turbine engine, the vane ring including a plurality of radially protruding lug members and a plurality of radial loading elements attached to corresponding lug members, the vane support having a plurality of radial slide channels recessed therein and associated with corresponding lug members and a plurality of load abutments associated with corresponding radial loading elements, the method comprising: installing a guide tool having a plurality of individual segments to the vane support, the installed segments having a plurality of lead-in tapers associated with corresponding ones of the radial load abutments; positioning the radial loading elements collectively against corresponding ones of the lead-in tapers; displacing the vane ring toward the vane support, the lead-in tapers collectively and simultaneously flexing the corresponding radial loading elements into a radial loading state, until the vane ring is positioned into a loaded position on the vane support wherein, in said loaded position, each lug member is disposed in radial sliding engagement with a corresponding radial slide channel of the vane support such as to at least partially angularly support and position the vane ring in place within the vane support and the radial loading elements abut and exert a radial pushing force against corresponding radial load abutments of the vane support, the radial loading elements thereby radially biasing the vane ring relative to the vane support and restraining relative radial movement between the vane ring and the vane support during operation of the gas turbine engine; and removing the guide tool from the vane support while leaving the vane ring in the loaded position on the vane support.

The term ‘radial’ as used herein is intended to refer to a direction which lies in a plane that is substantially perpendicular to the longitudinal engine axis 11 of the gas turbine engine 10, and which extends away from the longitudinal axis 11 as a radius of a circle having the axis 11 at its center. The term ‘tangential’, is intended to refer to a direction substantially perpendicular to a radial direction, and the term “circumferential” is intended to refer to a direction along a circle defined in said plane and around the axis 11.

BRIEF DESCRIPTION OF THE DRAWINGS

Further features and advantages of the present invention will become apparent from the following detailed description, taken in combination with the appended drawings, in which.

DETAILED DESCRIPTION

Figure 1:
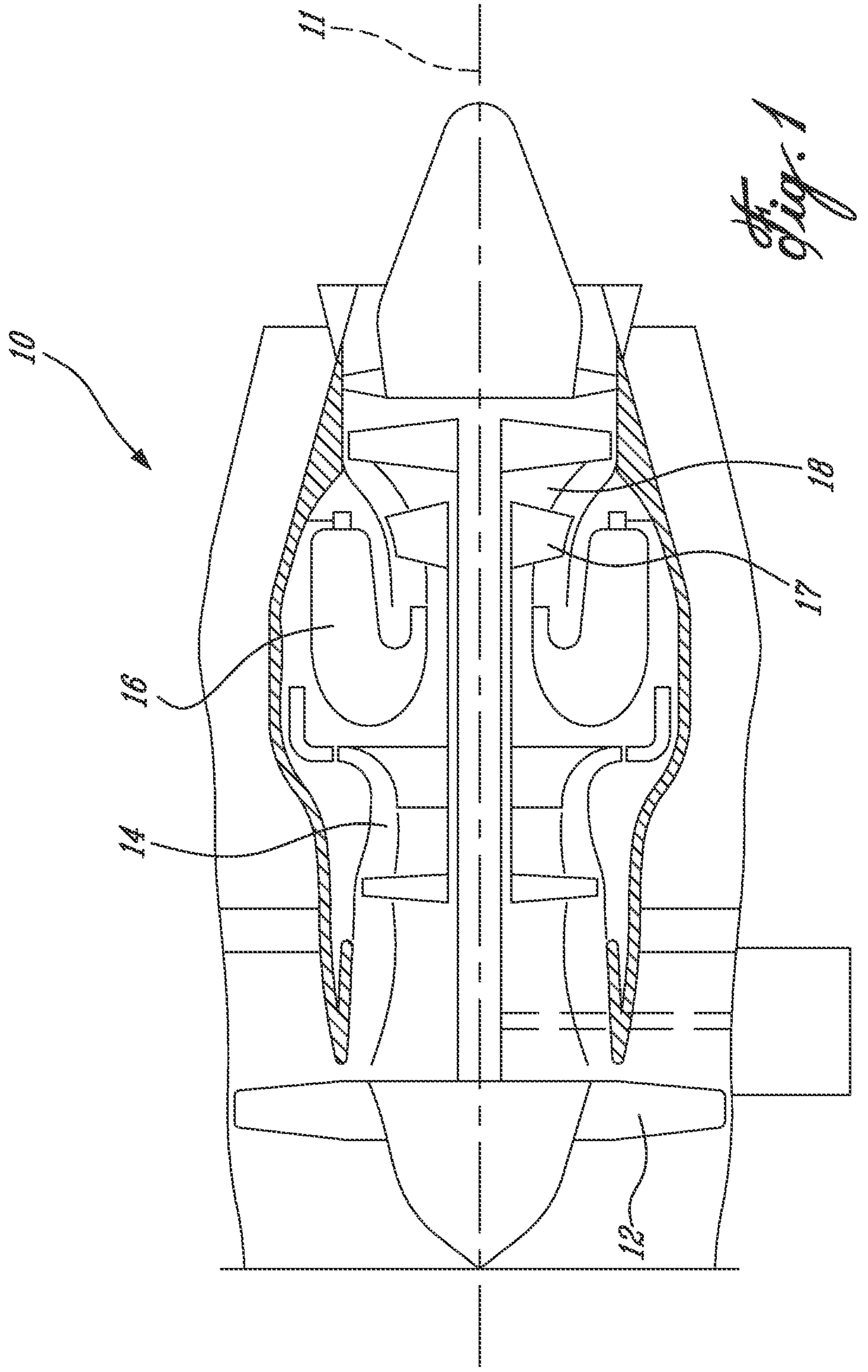
FIG. 1 is schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Fuel is injected into the combustor 16 of the gas turbine engine 10 by a fuel injection system 20 which is connected in fluid flow communication with a fuel source (not shown) and is operable to inject fuel into the combustor 16 for mixing with the compressed air from the compressor 14 and ignition of the resultant mixture. The fan 12, compressor 14, combustor 16, and turbine 18 are preferably all concentric about a common central longitudinal axis 11 of the gas turbine engine 10.

The turbine section 18 of the gas turbine engine 10 may comprise one or more turbine stages. In FIG. 1, two turbine stages are shown, including a first, or high pressure (HP), turbine stage 17, which includes a rotating turbine rotor with a plurality of radially extending turbine blades and a static turbine vane assembly 22, or stator assembly, shown in FIG. 2, which is mounted upstream of the turbine rotor. The HP turbine vane assembly 22 is disposed immediately downstream from the exit of the combustor 16.

Figure 2:
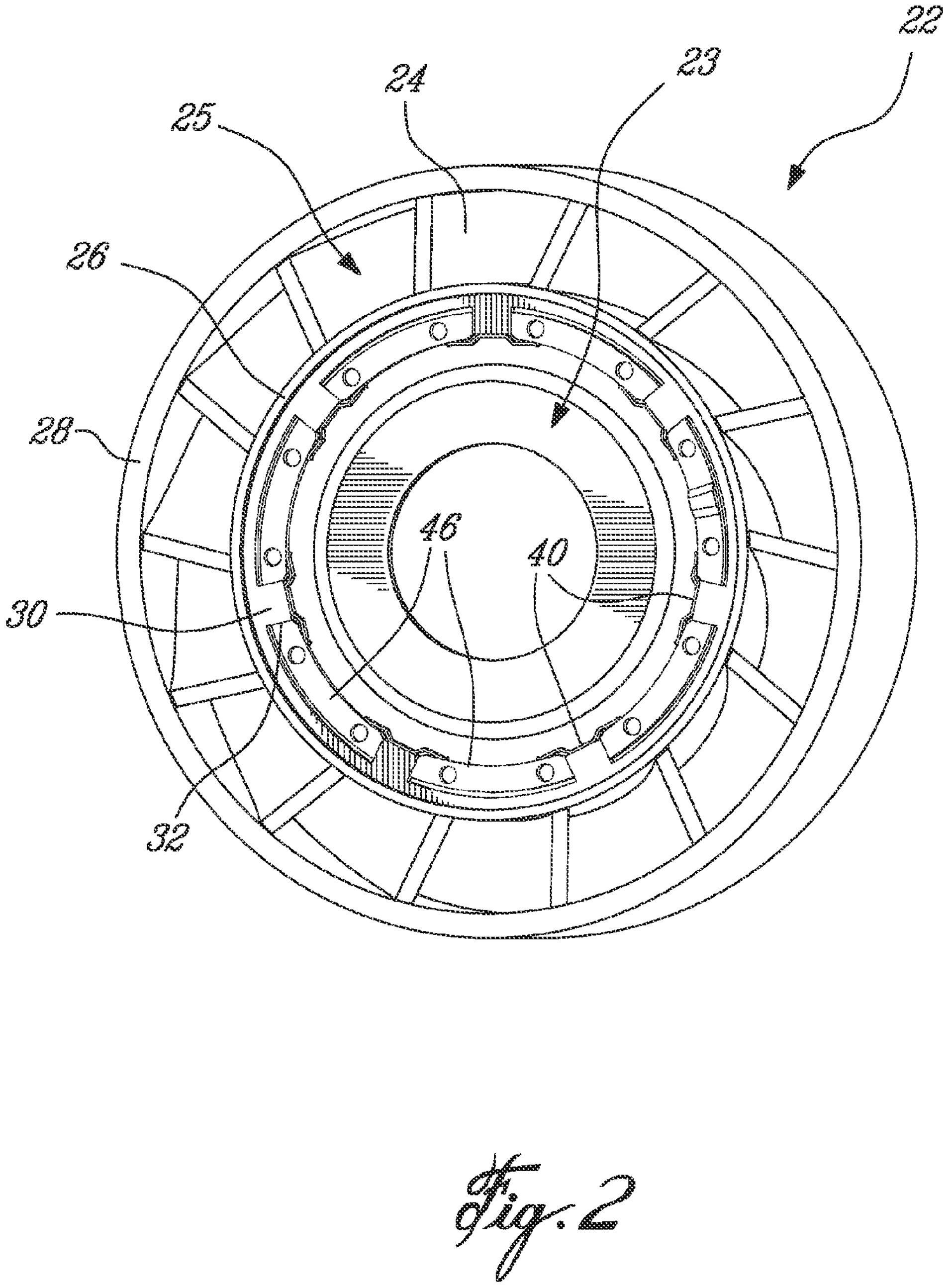
FIG. 2 is a perspective view of a turbine vane assembly of the engine of FIG. 1.

In the turbine vane assembly 22 as shown in FIG. 2, radial loading elements which generate a radial load force against the vane ring radially bias or load the vane ring relative to the surrounding vane support, which contributes to limit relative radial movement between the vane ring and the vane support during operation of the gas turbine engine. Such a turbine vane assembly is disclosed in U.S. patent application Ser. No. 11/955,867 filed Dec. 13, 2007, the entire content of which is incorporated herein by reference. However, when assembling such a vane ring within the vane support, unless a tool is used to enable a number of the radial loading elements to be simultaneously biased, individual manual flexing of each radial loading element would be required, which would be undesirably time consuming.

Referring in further detail to FIG. 2, the turbine vane assembly 22 of the HP turbine stage 17 is shown. The turbine vane assembly 22 comprises generally an inner vane support 23 and a vane ring 25 mounted thereto. The vane support 23 is fixed to a support structure within the engine. This may be done using bolts or other attachment means to fix the vane support in place 23. The vane ring assembly 25 includes a plurality of airfoils 24 which extend substantially radially between an inner vane platform 26 and an outer vane platform 28, which define an annular gas flow passage therebetween. The outer vane platform 28 engages an outer combustion chamber wall and the inner vane platform 26 engages an inner combustion chamber wall, thereby defining therebetween the annular hot gas path from the combustion chamber outlet through the annular passage of the vane assembly 22. In this example, the turbine vane ring 25 is a one-piece annular stator vane ring.

Figure 3:
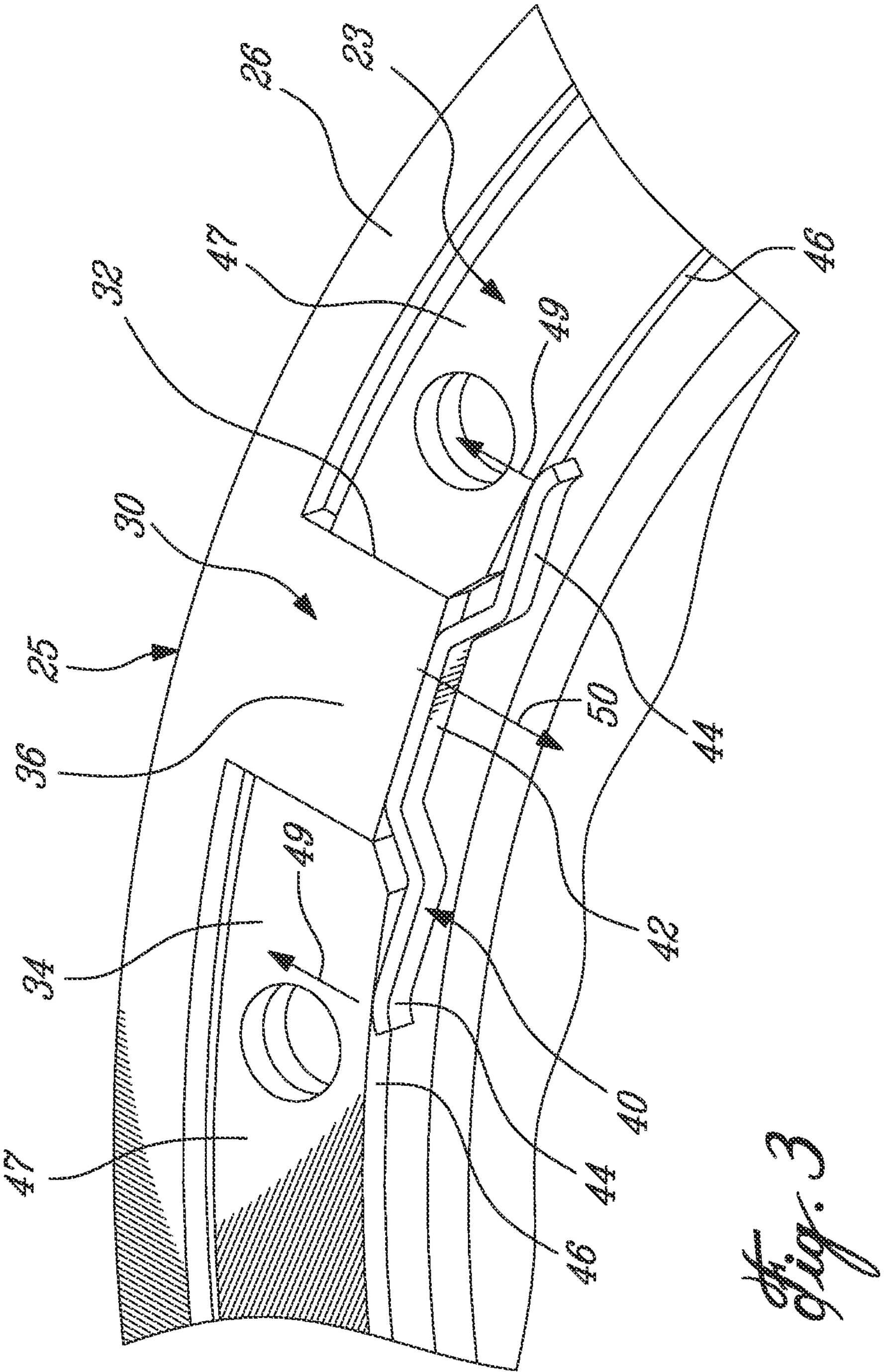
FIG. 3 is a perspective view of a portion of the turbine vane assembly of FIG. 2, fragmented, showing a portion of the vane ring mounted on the inner vane support.

The vane ring 25 is mounted to the radially inner vane support 23 by a mounting configuration which includes a number of lugs 30 slidingly engaged with cooperating recesses 32, or radial sliding channels. More specifically, a number of lugs 30 radially inwardly protrude from the inner vane platform 26 of the vane ring assembly 25. As best seen in FIG. 3, each of these lugs 30 are received within corresponding recesses 32 formed in the radially outer periphery 34 of the vane support 23. The cooperating lugs 30 and recesses 32 prevent angular relative movement, or rotation, between the vane support 23 and the vane ring 25 of the vane assembly 22, while nevertheless allowing for some radial displacement such as may result from a thermal expansion differential therebetween.

However, in order to limit unwanted or excess radial displacement of the vane ring 25 relative to its vane support 23, the vane assembly 22 includes a number of radial loading elements 40 which apply a substantially constant inwardly-directed radial load against the turbine vane ring 25, such as to thereby avoid or reduce movement of the vane ring 25 which can cause undesirable engine vibration. More particularly, the radial loading elements 40 are in a flexed state when the vane ring 25 is assembled to the vane support 23, and abut against corresponding radial-facing abutment surfaces 46 of the vane support. The radial loading elements 40 thus exert a radially-outward radial load 49, or pushing force, against corresponding abutment surfaces 46, which results in a radially-inward pulling force 50 being exerted on the lugs 30 to which they are attached.

Still referring to FIG. 3, each of the locating lugs 30 of the vane ring 25 includes a radial loading element 40 fixed to a radially inner end 36, or remote end, of the lug 30. The radial loading element 40 can be connected, or attached to the radially inner end 36 of the vane lug 30 by a number of methods, including welding, brazing and/or fastening. The radial loading element 40 comprises, in one embodiment, a thin elongated, leaf-spring type, piece of curved sheet metal. The radial loading element 40 is flexed during assembly of the vane assembly 22, and then maintained in a flexed, or radially-biasing, state.

More specifically, in at least one embodiment, the radial loading element 40 includes a leaf-type spring which has a central portion 42 fixed to the radially inner end 36, and two protruding outer spring arms 44 which extend generally tangentially away from the central portion 42. The central portion 42 of the radial loading element 40 is fixed to the radial inner end 36 of the lug 30, and the outer spring arms 44 are positioned against a radially-inner abutment surface 46 formed in a radial-facing surface on an arc-shaped, longitudinally protruding stop member 47 of the vane support 23. The outer spring arms 44 are maintained in a radially-outwardly flexed state such as to exert a radially-inward directed biasing force on the lug 30 to which the radial loading element 40 is fixed.

Accordingly, and referring back to FIG. 2, each of the circumferentially spaced apart radial loading elements 40 exerts a radially directed biasing force on the vane ring 25, which contributes to force the vane ring 25 to maintain a concentric and centralized position within the engine relative to the central longitudinal axis 11, while preventing excessive radial movement of the vane ring 25 relative to its vane support 23. This accordingly reduces overall vibration when the gas turbine engine is in operation, as radial displacement of the vane ring 25 is limited. This is particularly useful when the engine is running at low power or at transient conditions where aerodynamic force may be insufficient to keep the vane ring in place. The radial loading elements 40 also help to improve the sealing efficiency of the vane ring 25 within the engine and to reduce fretting on the parts supported by the vane ring assembly.

The radial loading element 40 may be made of spring steel or another suitable material, provided sufficient resilience is present to permit the radial loading element 40 to naturally return to its un-sprung, or unflexed position, such that when the radial loading element 40 is in the flexed position against the abutment surface 46 of the vane support 23 (as shown in FIG. 3), the radial loading element 40 biases, or loads, the lug 30 of the vane ring 25.

Figure 4:
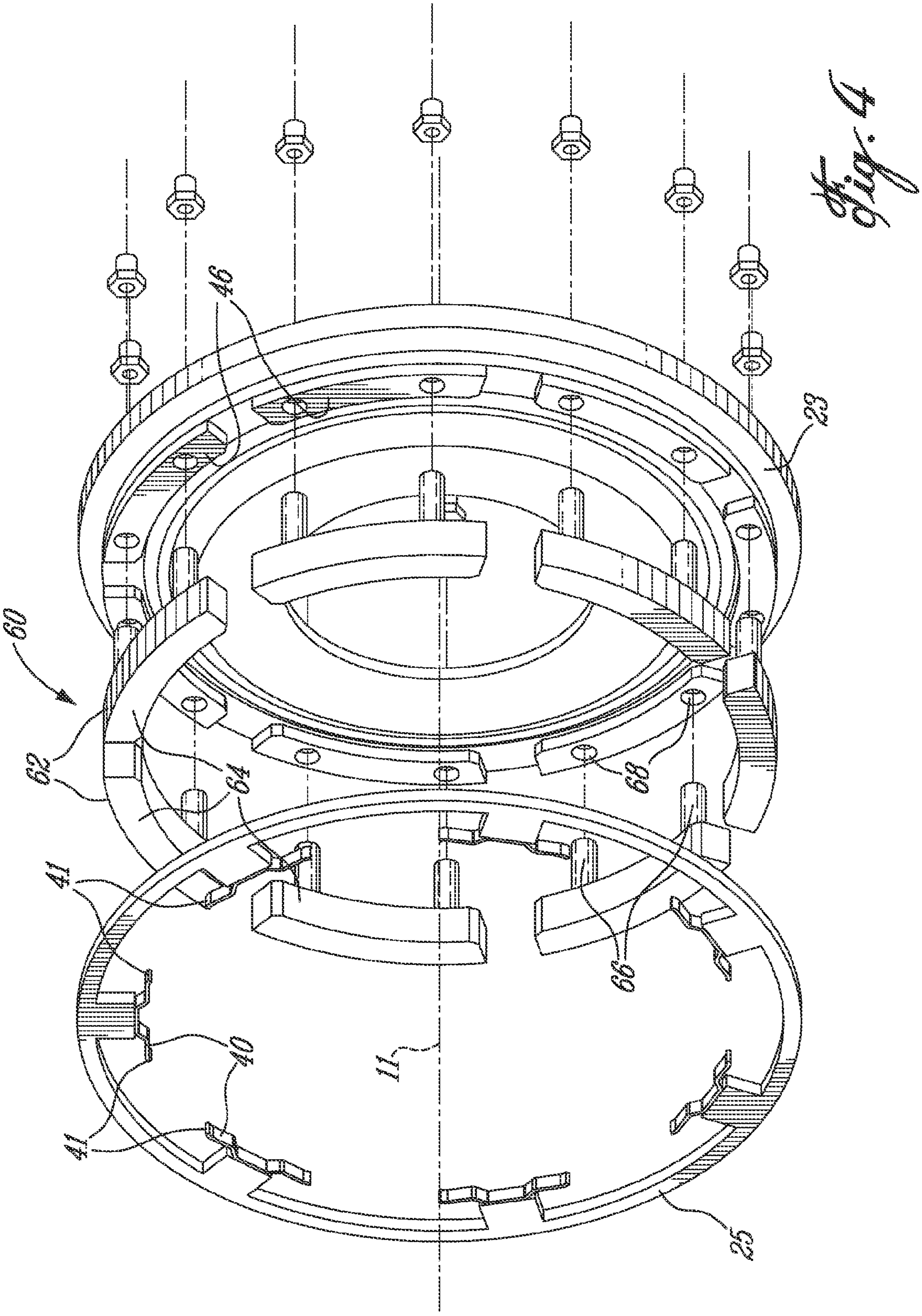
FIG. 4 is an exploded view of the turbine vane assembly of FIG. 2, with a guide tool for use during assembly.

FIG. 4 is an exploded view which show the vane ring 25 and the vane support 23 unassembled. The abutment surfaces 46 of the vane support 23, which receive the radial loading elements 40, are circumferentially interspaced around a circle concentric to the longitudinal axis 11, and having a first radius. In FIG. 4, since the vane ring 25 is unassembled, the radial loading elements 40 are in an unflexed, or unbiased state, contrary to a flexed state, such as shown in FIGS. 2 and 3, when the vane ring 25 is assembled. Abutment surfaces 41 of the radial load elements 40, which are to engage the abutment surfaces 46 of the vane support 23, are circumscribed within a circle having a second radius, greater than the first radius of the vane support abutment surfaces 46. Henceforth, each one of the radial load elements needs to be individually flexed to allow assembly of the vane ring 25 to the vane support 23, and radial loading engagement of the radial load elements 40 against corresponding abutment surfaces 46 or the vane support 23, as shown in FIG. 2.

Figure 5A:
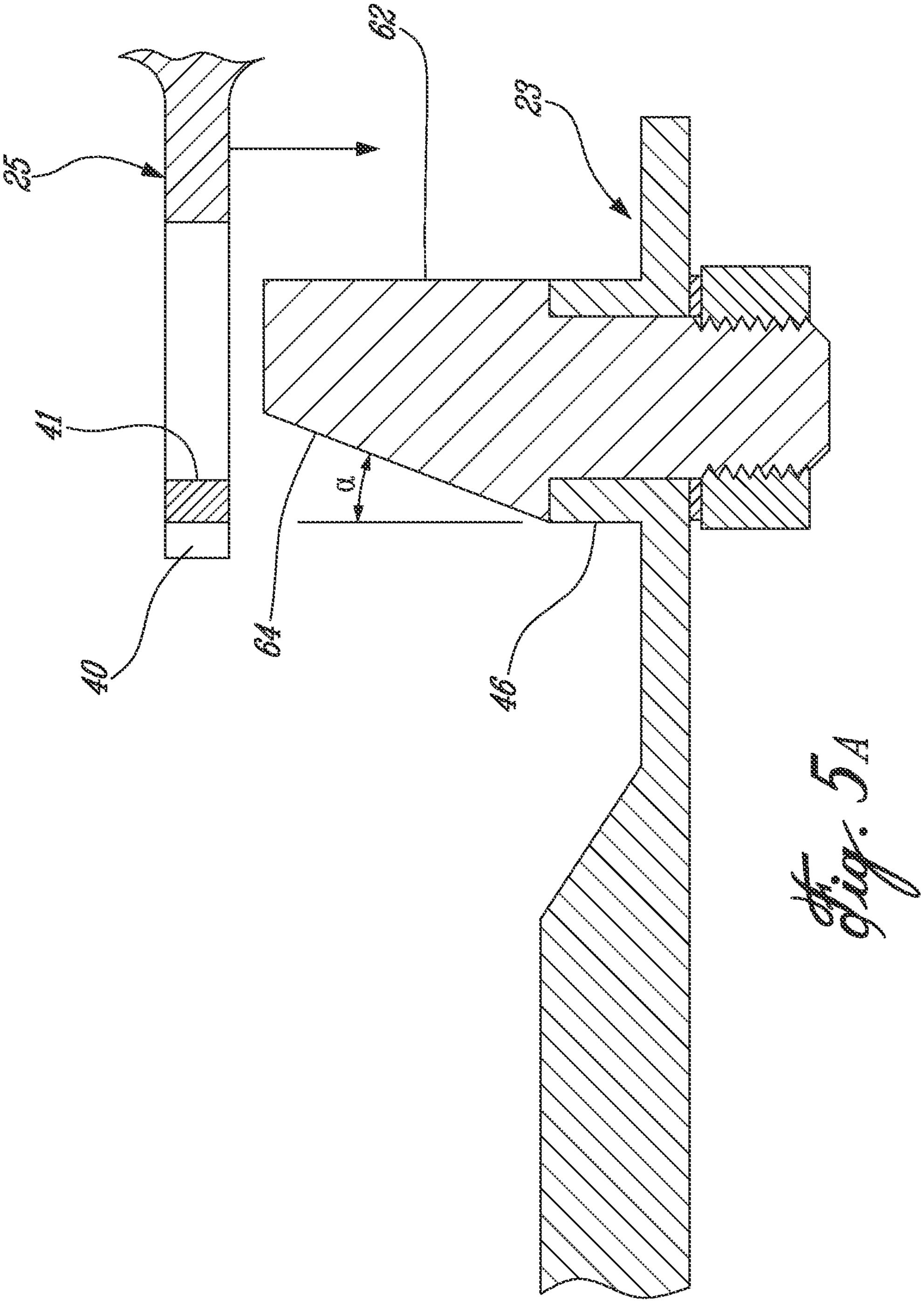
FIGS. 5A to 5C are partial cross-sectional views of the turbine vane assembly of FIG. 2, showing successive views of a method of assembling the vane ring to the vane support using the guide tool shown in FIG. 4.
Figure 5B:
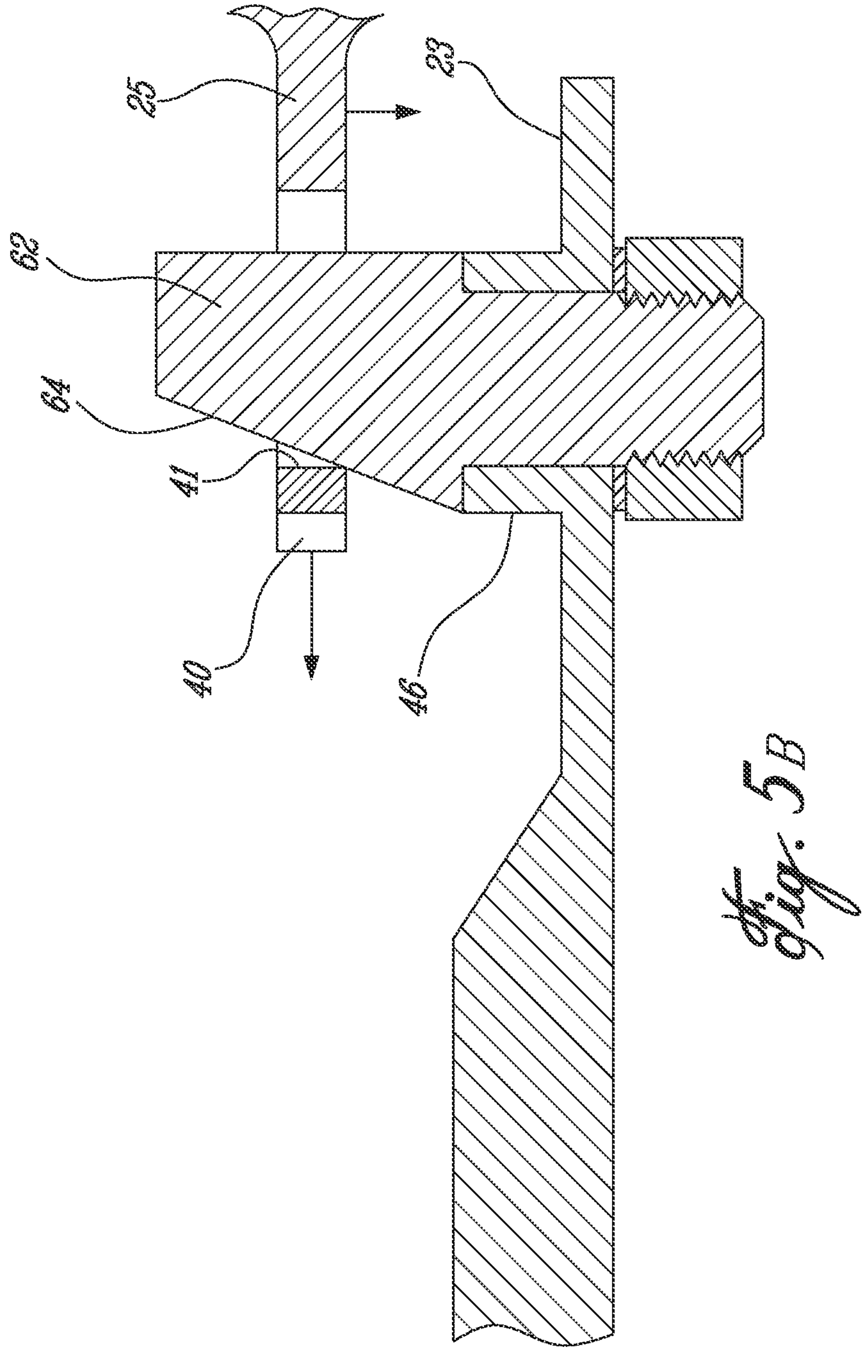
Figure 5C:
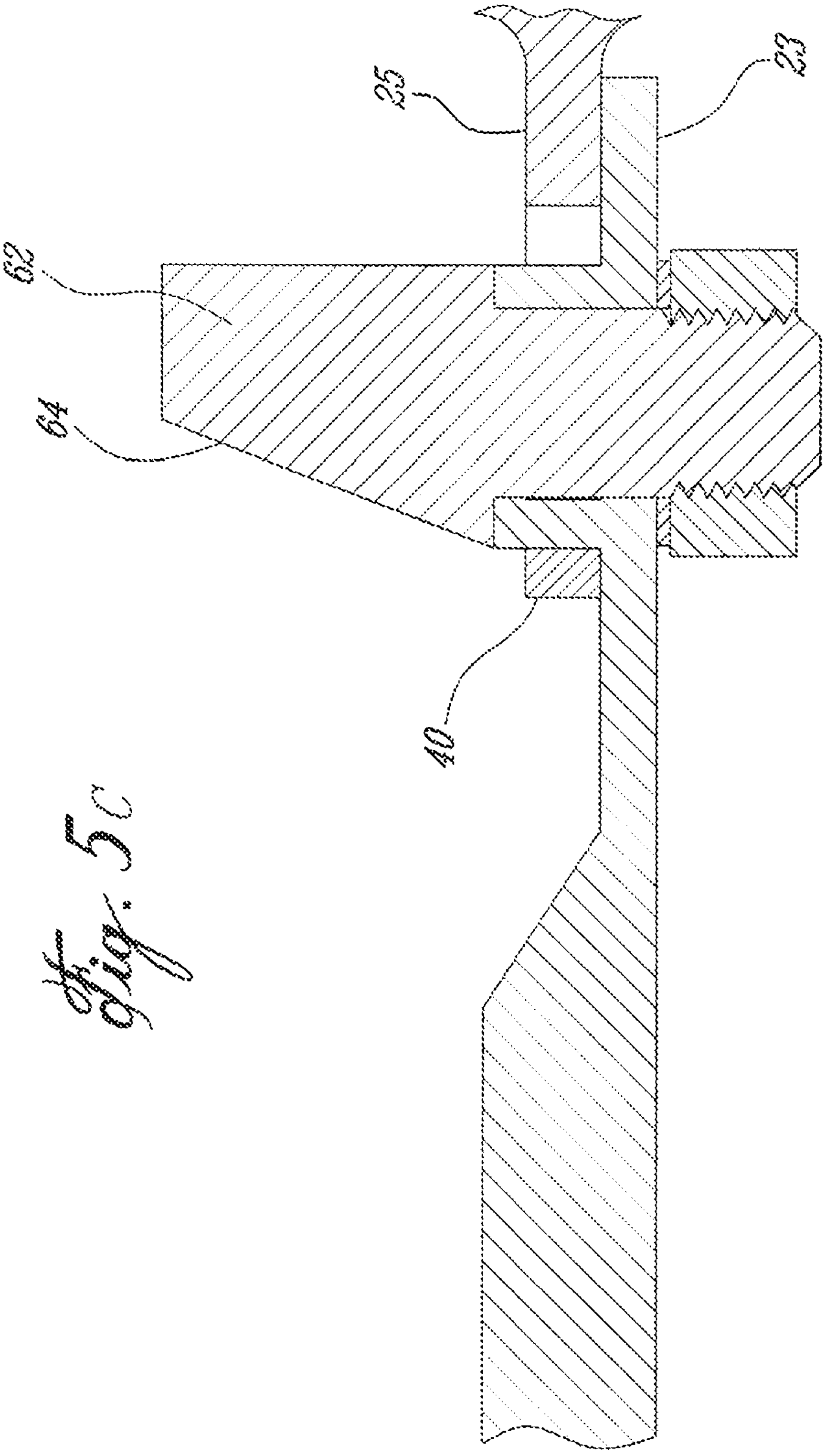
Figure 6:
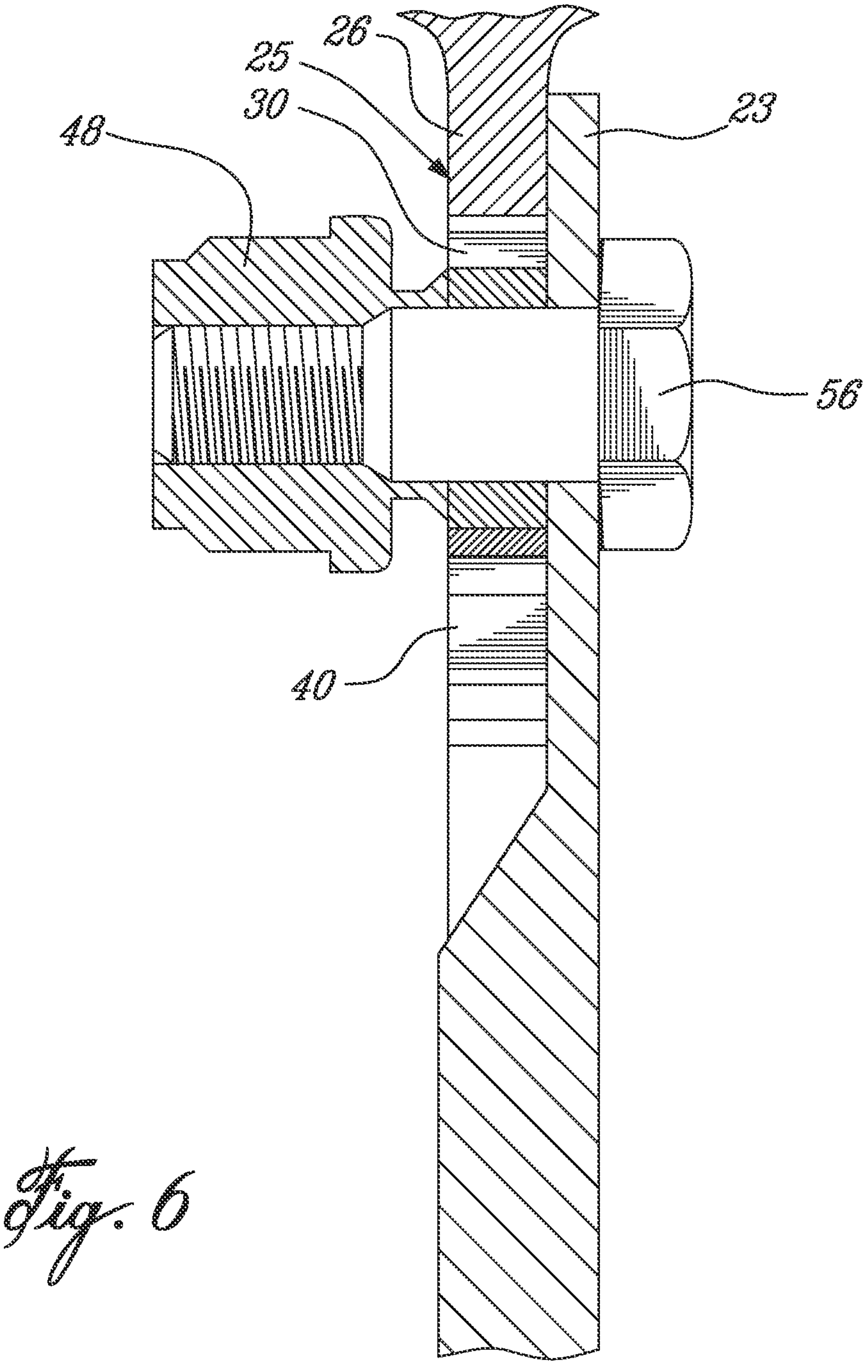
FIG. 6 is a partial cross-sectional view of the turbine vane assembly of FIG. 2 mounted to a supporting structure of the gas turbine engine.

In FIG. 4, a guide tool 60 including a plurality of arc-shaped segments 62 is also shown. It is to be understood that a single annular assembly tool ring can be used, in place of the separate arcuate segments 62. The guide tool 60 simplifies the flexing assembly operation by allowing each one of the radial load elements 40 to flex (i.e. be pre-sprung or compressed) simultaneously, as follows. The guide tool segments 62 are first assembled to the vane support 23, at a first end thereof, and have a second end, opposite the first end, which gradually tapers to a third radial position, greater than the second radial position of the radial load element abutment surfaces 41 when in the unflexed state. The vane ring 25 is then longitudinally moved, or pushed toward the vane support 23 until the unflexed radial load elements 40 engage corresponding lead-in tapers 64, or guide surfaces, of the guide tool 60, such as shown in FIGS. 5A and 5B. The vane ring 25 is then pushed further toward the vane support, and the radial load elements 40 are thus slid against the tapered guiding surface 64 of the guide tool, which results in gradually flexing the corresponding radial load elements 40 until the abutment surface 41 thereof reaches the first radial position which corresponds to the radial position of the vane support abutment surfaces 46, and allows assembly of the vane ring 25 to the vane support 23, such as shown in FIG. 5C. The guide tool can then be removed from the vane support 23 while the vane ring 25 remains assembled thereto. Henceforth, using the guide tool, each one of the radial load elements 40 are simultaneously flexed, rather than having to flex the radial load elements 40 one by one by hand to achieve the vane assembly. Once the vane assembly is complete, it can be assembled to a supporting structure 48 of the gas turbine engine, using bolts 56 or the like, such as illustrated in FIG. 6.

In the example given above, the guide tool 60 has arcuate segments 62 which are shaped like the corresponding stop structures 47 on the vane support 23 (see FIG. 3). It will be understood that alternate configurations as possible, such as a the arcuate segments 62 being integrally formed into a single annular ring. Further, each one of the arcuate segments 62 has two threaded rods or fasteners 66 protruding from an end thereof (see FIG. 4), this was designed to adapt the guide tool 60 to corresponding bores 68 in the vane support 23, and to allow securing the guide tool 60 to the vane support 23 using the threaded rods 66. For alternate vane supports, the guide tool fastening means can be adapted accordingly. Also, the guide tool can be provided in a greater number smaller segments, for example, inasmuch as a lead-in taper is provided for each radial load element and abutment surface combination. For example, the lead-in tapers can be made integral to the vane support in alternate embodiments.

With respect to the vane assembly itself, although the radial loading element 40 is depicted and described in the above embodiment as a leaf-type spring, it is to be understood that the radial loading elements 40 may be formed in a variety of other manners and having a number of alternate configurations. Other forms, shapes and configurations of spring elements are also possible, providing they are able to generate a spring load force in a radial direction when mounted between each lug 30 of the vane ring 25 and the vane support 23. Further, although the leaf-springs shown and described herein are individual elements, each one being fixed to one of the locating lug members 30, the radial loading elements 40 can instead be composed of a single annular ring which fits for example within a circular channel of the vane support and includes abutting portions which engage each of the lugs at openings in the circumferential channel. It will be understood that the guide tool can be adapted accordingly.

Although the vane assembly 22 has been described herein with reference to a turbine vane assembly, it is to be understood that the assembly method and tools described with respect to their use with the vane assembly 22 can also be used in connection with a compressor van assembly in the compressor section of the engine. The mounting structure and radial load element described above are equally applicable to a compressor vane assembly. Further, although the radial load element has been described above with respect to the inner vane platform mounting structure, it is to be understood that such a radial load element can also be provided between a mounting member of the vane outer platform and the corresponding support structure, in addition to or in place of that used for engaging the vane inner platform to the support structure within the engine. The guide tool can be adapted accordingly.

The embodiments of the invention described above are intended to be exemplary. Those skilled in the art will therefore appreciate that the forgoing description is illustrative only, and that various other alternatives and modifications can be devised without departing from the spirit of the present invention as defined by the appended claims. Accordingly, the present is intended to embrace all such alternatives, modifications and variances which fall within the scope of the appended claims.

The invention claimed is:

1. A method for assembling a vane ring with a vane support of a vane assembly in a gas turbine engine, the vane ring having a plurality of annularly interspaced radial loading elements which, when the vane ring is assembled to the vane support, are in a resiliently flexed state and exert corresponding annularly interspaced and outward-oriented radial loads against the vane support, thereby restraining relative radial movement between the vane ring and the vane support during operation of the gas turbine engine, the method comprising simultaneously flexing each of the radial loading elements into the resiliently flexed state by sliding the radial loading elements against corresponding lead-in tapers and subsequently assembling the vane ring to the vane support.

2. The method of claim 1, further comprising, prior to said flexing, installing a plurality of arc-shaped guide tool segments in an annularly interspaced configuration onto the vane support, the arc-shaped guide tool segments having defining the lead-in tapers thereon.

3. The method of claim 1 further comprising, prior to said flexing, collectively positioning the radial loading elements in an unflexed state against the corresponding lead-in tapers.

4. The method of claim 1 wherein the step of simultaneously flexing includes displacing the vane ring longitudinally towards the vane support, thereby collectively sliding the radial loading elements against the corresponding lead-in tapers and simultaneously flexing the radial loading elements into the resiliently flexed state, and continuing said displacement until the vane ring is assembled to the vane support.

5. The method of claim 2 wherein the step of simultaneously flexing includes displacing the vane ring longitudinally towards the vane support, thereby collectively sliding each radial loading element against a corresponding lead-in taper and simultaneously flexing the radial loading elements into the resiliently flexed state, until the vane ring is assembled to the vane support.

6. The method of claim 2 further comprising, subsequent to said flexing, removing the guide tool segments from the vane assembly.

7. The method of claim 5 further comprising, subsequent to said flexing, removing the guide tool segments from the vane assembly.

8. The method as defined in claim 1, wherein the radial loading elements are attached to corresponding radially protruding lug members, the vane support having a plurality of radial slide channels recessed therein and associated with corresponding lug members and a plurality of load abutments associated with corresponding radial loading elements, the step of flexing further comprising:

displacing the vane ring toward the vane support, the lead-in tapers collectively and simultaneously flexing the corresponding radial loading elements into a radial loading state, until the vane ring is positioned into a loaded position on the vane support wherein, in said loaded position, each lug member is disposed in radial sliding engagement with a corresponding radial slide channel of the vane support such as to at least partially angularly support and position the vane ring in place within the vane support and the radial loading elements abut and exert a radial pushing force against corresponding radial load abutments of the vane support, the radial loading elements thereby radially biasing the vane ring relative to the vane support and restraining relative radial movement between the vane ring and the vane support during operation of the gas turbine engine; and removing the guide tool from the vane support while leaving the vane ring in the loaded position on the vane support.

9. The method of claim 8, wherein the guide tool segments each have at least one threaded fastener protruding longitudinally from the first end thereof, the step of installing comprising inserting the threaded fasteners into corresponding bores provided in the vane support and fastening a remote end of the threaded fasteners which extend through the bores.

10. The method of claim 8, wherein the step of installing comprises leaving circumferentially interspaced spacings between adjacent guide tool segments, the spacings between the installed guide tool segments providing longitudinal paths for the lug members leading to corresponding radial slide channels.

11. The method of claim 8, wherein the radial loading exert a radially outward pushing force against the abutments, thereby also exerting a radially inward pulling force on the lug members to which they are attached.

* * * * *